Figure 5:
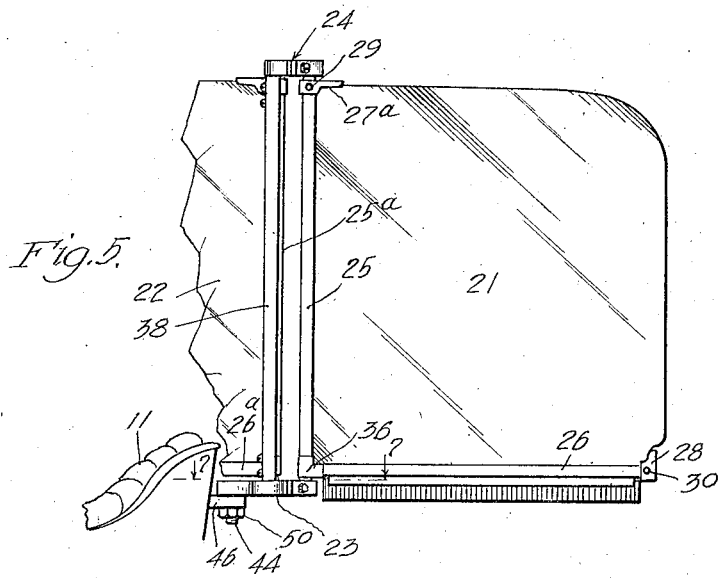

Nov. 18, 1924.
A. C. LILLIE
1,515,957
AUTOMOBILE WINDSHIELD
Filed Jan. 31, 1921 3 Sheets-Sheet 1
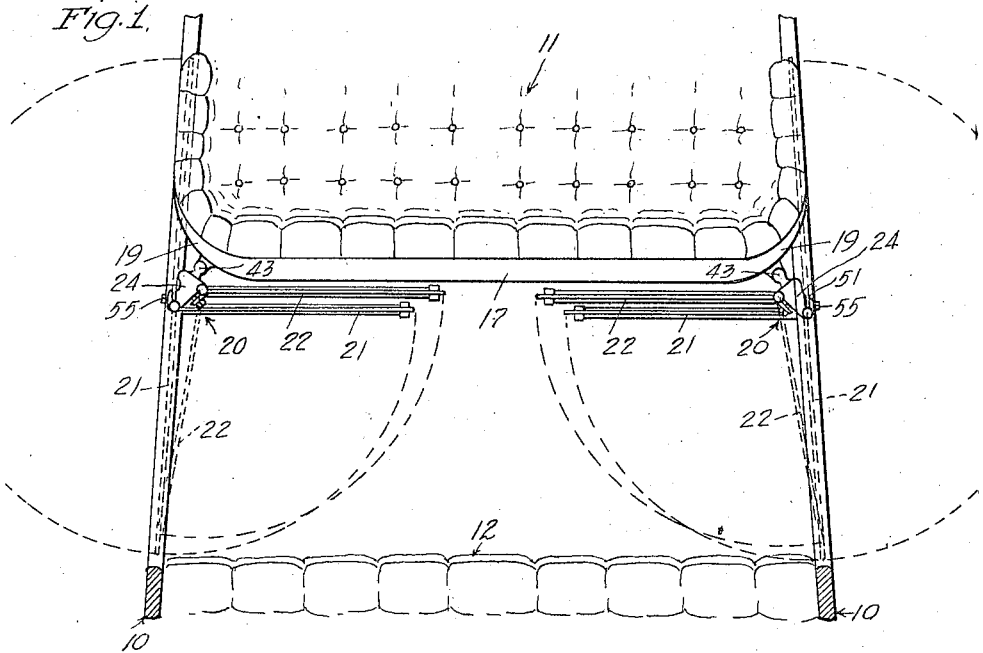
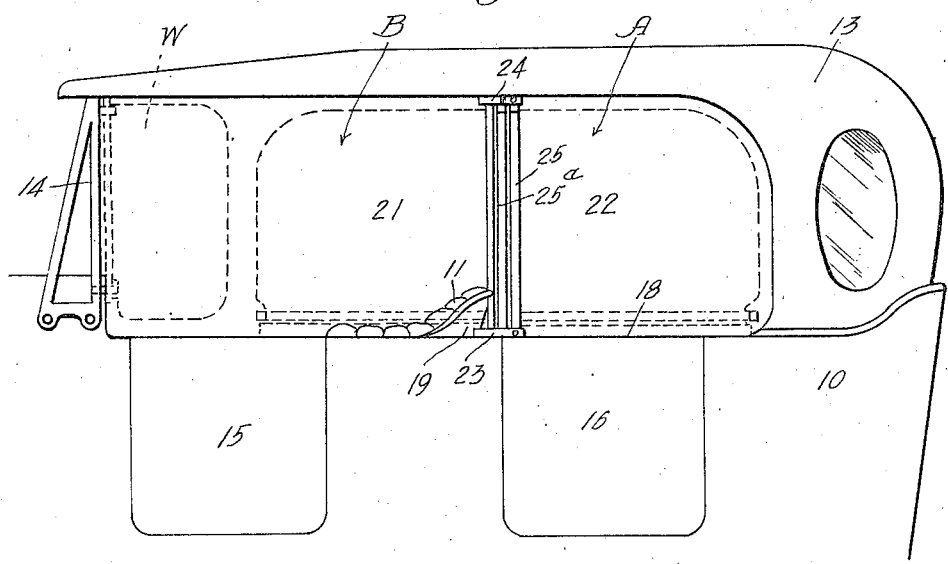
Inventor:
Arthur C. Lillie
By James T. Buckles
his Attorney

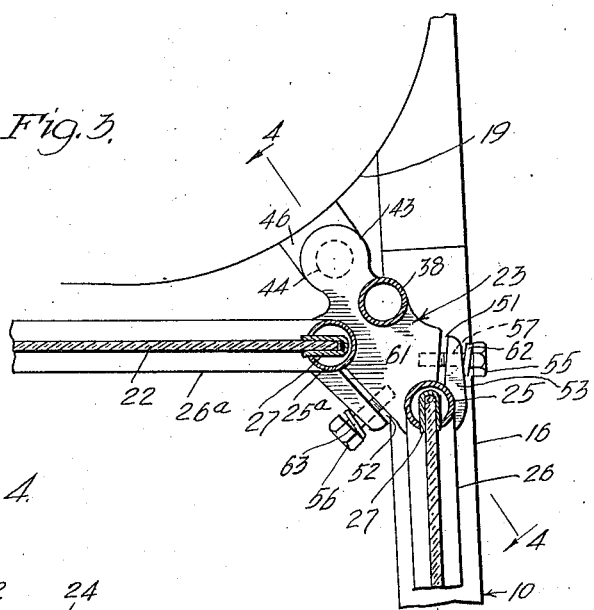
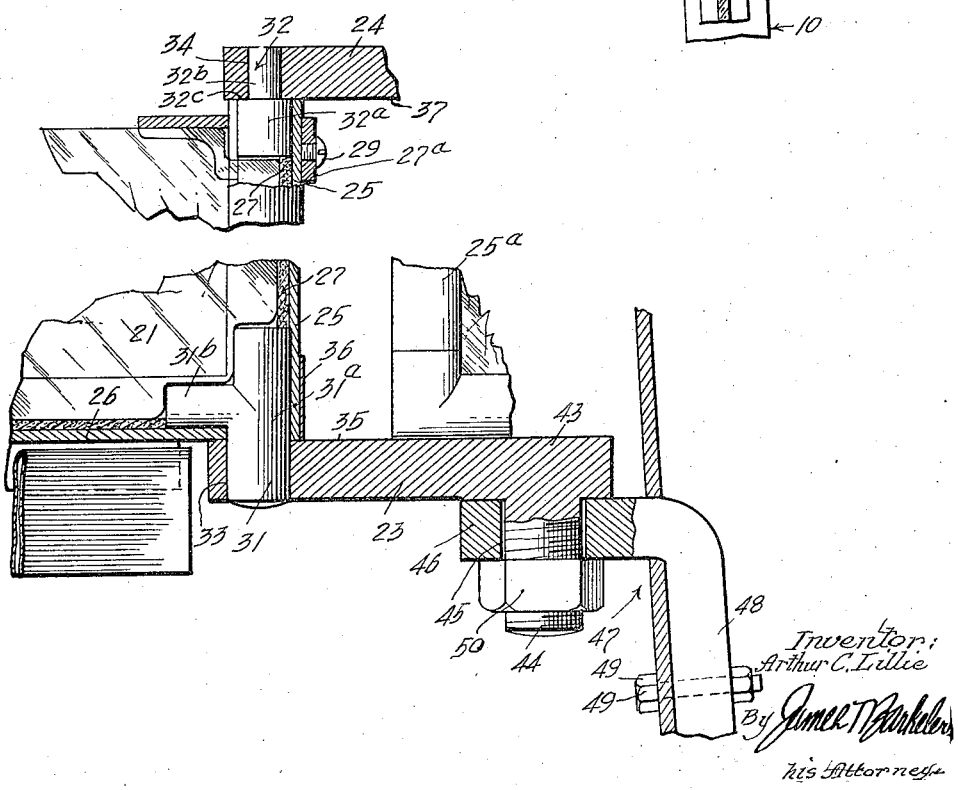

Nov. 18, 1924.

A. C. LILLIE 1,515,957

AUTOMOBILE WINDSHIELD

Filed Jan. 31, 1921

3 Sheets-Sheet 3

Inventor:
Arthur C. Lillie

By James T. Barkeler
his Attorney

Patented Nov. 18, 1924.

1,515,957

UNITED STATES PATENT OFFICE.

ARTHUR C. LILLIE, OF LOS ANGELES, CALIFORNIA.

AUTOMOBILE WINDSHIELD.

Application filed January 31, 1921. Serial No. 441,240.

*To all whom it may concern:*

Be it known that I, ARTHUR C. LILLIE, a citizen of the United States, residing at Los Angeles, in the county of Los Angeles, State of California, have invented new and useful Improvements in Automobile Windshields; and I declare the following to be such a full, clear, and exact disclosure of the invention that anyone skilled in the art to which it appertains may make and use the same.

My invention relates to windshields, or wind and rain deflectors for motor vehicles, and the like; and particularly to a deflector primarily adapted for use on two-seated vehicles of the type commonly known as touring cars.

Broadly speaking, the device is adapted to be mounted on the back of the front seat of the vehicle, adjacent the point of juncture of the later with the side walls of the body; and is adjustable in such manner that it may be folded within the tonneau of the body, back of the front seat; or it may be adjusted to enclose either the front seat at the sides and rear thereof, the tonneau at the front and sides thereof, or enclose both the front and rear seats; functioning in the latter instance by extending along the sides of the vehicle body between its top edge and the vehicle top, and intermediate the ends of the side openings of the latter.

Essentially the invention comprises a pair of pivotally mounted plate glass shield members and mounted therefor; and the gist of my invention resides particularly in the said mountings and the relative positions in which the said shield members are pivotally supported thereon; so as to permit the latter being adjusted to their several positions, on the rear of the front seat, to either enclose the front seat or tonneau, or both, as above stated.

In the herein described preferred specific embodiment of my invention, while not limited to such, it is an object to provide a type of mounting for windshields of this character, adapted to be mounted on the back of the front seat, wherein the shield members are so mounted as to enable them to be swung inwardly, parallel with the back of the front seat; or to be moved to relative positions to enclose the front seat, at the sides and back thereof; the tonneau at the sides and front thereof; or substantially parallel with the sides of the vehicle body to enclose both the front seat and tonneau.

A further object in arranging the pivotal points of the shield members in the above manner, is to permit their being mounted on vehicles wherein the rear of the front seat extends above the top of the sides of the vehicle body, with their bottom edges supported in a plane intermediate the top of the back of the front seat and the top of the sides of the vehicle body, and yet be adjustable to effect the aforementioned several enclosures of the front seat and tonneau.

Further, it is a feature of the specific form of my invention that when the shield members are moved into position to enclose the front seat, or the front seat and tonneau, the pivotal edge of the outer shield will so overlap the pivotal edge of the inner one, in a rearwardly direction, as to prevent air currents or rain from entering between them when the vehicle is traveling in a forward direction.

The merits of my invention will be more fully set forth in the following specification, reference being made therein to the accompanying drawings in which I have illustrated the preferred specific form, and in which:—

Figure 6:
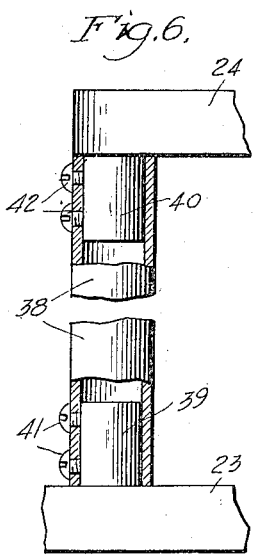
Figure 7:
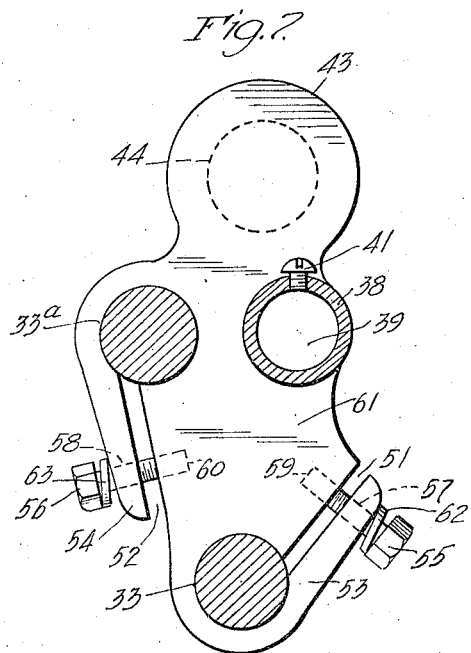

Fig. 1 is a fragmentary plan view of a motor vehicle of the touring car type, showing my invention as attached thereto; Fig. 2 is a fragmentary side elevation of the same; Fig. 3 is an enlarged plan view, partly in section, showing the lower mounting plate for the wind deflectors; Fig. 4 is a vertical section of the same taken on line 4—4 of Fig. 3; Fig. 5 is an elevation showing a little more in detail the wind deflectors and mountings; Fig. 6 is an enlarged fragmentary elevation partly in section showing the manner of bracing the wind deflector mountings; and Fig. 7 is an enlarged plan view of the supporting plate, the view being taken as indicated by the line 7—7 of Fig. 5.

Referring to the drawings, and particularly to Figs. 1 and 2, the numeral 10 designates a typical automobile body of the touring car type, having front and rear seats 11 and 12, respectively, the usual top 13, and a front windshield 14. The usual front and rear doors for gaining access to the front and rear seats 11 and 12, are indicated by the numerals 15 and 16, respectively. As is usual in the construction of motor vehicle bodies of this type, the back 17 of the front seat 11 is shown to extend above the plane of the tops of the side walls of the body and the doors 15 and 16; and to curve forwardly (and downwardly along its top) toward the points where it makes its juncture with the side walls of the body, these curved portions being indicated by the numeral 19.

My invention resides in the particular manner of mounting a pair of adjustable shield members or deflectors on the rear face of the back 17 of the front seat 11, adjacent either end thereof, and preferably on the curved surfaces 19, adjacent their juncture with the side walls of the body 10. A pair of the devices or units are provided, in order that both sides of the vehicle may be properly enclosed; and my reason for mounting the support for the shield members at the point indicated in the drawings, is to permit various adjustments of the individual members to either enclose the front seat alone, or to enclose the lateral sides of the front seat and tonneau as will fully appear from the details hereinafter set forth. The pairs of shield members are each generally designated by the numeral 20, and as each unit is typical in design, construction and operation (with the exception that they are made in rights and lefts) the detailed description of their construction and operation will be hereinafter directed to but one of them.

Specifically the invention comprises a pair of typical wind deflectors or shield members 21 and 22, preferably constructed of plate glass, each being suitably mounted in supporting frames which, in turn, are pivotally mounted in a supporting plate 23, secured to and supported upon the rear face of the back 17 of the front seat 11. The tops of the shield frames are also suitably braced and pivotally journaled in a brace plate 24, similar in construction and configuration to the plate 23. While it is preferable to use the brace plate 24 in the device, it will be readily apparent that this particular element may be omitted if desired; the upper pivot of the shield supporting frames being journaled in some other manner, as, for instance, in the vehicle top or its framework; or, by making the supporting bracket 23 of a little heavier construction the top bracing of the structure may be omitted entirely. It is an important feature of my invention, in its application to vehicles wherein the back of the front seat extends above the tops of the sides of the body, that the supporting plate 23 be mounted so as to support the shield members with their bottom edges movable in a plane intermediate the top of the back of the front seat and the top of the sides of the vehicle body, and preferably just above the latter. And it is this manner of mounting, together with my particular positioning of the pivotal points of the shield members, that permits the shield members to be moved into the several positions to enclose either the front seat or the tonneau, without leaving a wide space below their bottom edges and the top edges of the body.

Referring now to the shield members 21 and 22, and referring particularly to Fig. 5, they are preferably cut to the configuration shown in the drawing and each may be of any size suitable to accomplish the desired purpose. The glass 22 is preferably cut to a size to adequately fill the space A, along the lateral side of the tonneau, and intermediate the top 13, front seat 11 and top 18 of the vehicle body 10, (see Fig. 2); and also to extend across the major portion of the space B, intermediate the top 13 and the top 18 of the vehicle body 10, and forward of the pivotal point of the shield member, and across the lateral end of the front seat 11. The deflector 22 is preferably of a size to likewise fill the space A, and to extend substantially half way across the rear of the front seat 11, (Fig. 1). The shield members 21 and 22 are supported along the bottoms and one side in frame members 25 and 26, and 25$^a$ and 26$^a$, respectively; these frame members preferably being formed of metal tubing slotted along one side, for the reception of the shield members, the latter being cushioned therein in seats of felt 27, or other suitable material, (clearly shown in Fig. 3), the frame members being bent to grip the felt and the glass and securely hold it in place. The shield members are further retained within the frame members by means of end clips 27 and 28 respectively, adapted to extend over the ends of these tubular frame members, and embrace the intersecting edges of the shields, being retained in place by means of small screws 29 and 30, respectively.

The shields 21 and 22 are pivotally mounted between the supporting plate 23 and the brace plate 24 by means of pintles 31 and 32, respectively, rigidly secured in opposite ends of the frame members 25 and 25$^a$, and revolubly journaled in bores 33 and 33$^a$ and 34 and 34$^a$ of the said supporting brace plates, respectively. This construction is best illustrated in Fig. 4 and shows the lower pintle 31 as consisting of a main cylindrical portion 31$^a$ having a lateral cylindrical arm 31$^b$, extending at substantially right angles thereto; the said arm 31$^b$ and the upper end of the portion 31$^a$ adapted to extend into and be gripped by the tubular frame members 26 and 25; the lower end of the frame member 25 and the lower frame member 26 riding on the upper surface 35 of the supporting plate 23, to support the deflector in proper position. A small right angular tubular clip 36 may be brazed around the juncture of the tubular frame members 25 and 26 with the lower pintle, to give added strength and rigidity to the construction. The upper pintle 32 consists of a cylindrical portion 32$^a$ adapted to extend into and be gripped by the upper end of the frame member 25, the upper end thereof being reduced as at 32$^b$ where it is journaled in the bore 34, thus forming a shoulder 32$^c$ thereon adapted to abut against the lower surface 37 of the brace plate 24 to securely hold the deflector against rattling and vertical movement.

The supporting plate 23 and the brace plate 24 are rigidly held in proper spaced relation by means of a tubular brace member 38, extending parallel with the frame members 25, cylindrical studs 39 and 40, preferably formed integral with the plates 23 and 24, respectively, extending into the opposite ends of this member, and being rigidly retained therein by means of cap screws 41 and 42. While the member 38 is here shown as being tubular, primarily to provide lightness of construction, it may, however, consist of a solid rod formed integral with either the supporting plate 23 or the plate 24, or it may be constructed to extend into bores in either of these elements in the manner of the pintles of the shield members.

As the supporting plate 23 and the brace plate 24 are typical in construction and configuration, as hereinbefore stated, with the exception that the plate 24 has no mounting support, the detailed description of these elements will be confined to the plate 23. The latter is best illustrated in plan in Figs. 3 and 7, and is preferably constructed in the configuration there shown, the particular dimensions being varied to suit circumstances and the weight it is designed to carry. The plate 23 has a portion 43 extending from one end thereof, this portion having a downwardly extending integral stud 44, depending from its lower face; this stud being adapted to extend through a bore 45 in a supporting arm 46 of the supporting bracket 47. The bracket 47 may be of any suitable configuration, but it is here shown as having a main portion or standard 48, extending through an aperture in the back of the front seat 11, it being secured thereto by bolts 49, or any other suitable means. It is obvious that any type of bracket may be supplied for suitably supporting the wind shields on the rear of the front seat; or a support may be provided which will support them directly upon the floor of a tonneau, in the position shown in Fig. 1, this support being braced in any suitable manner. The stud 44 is screw threaded to receive a nut 50, by means of which the plate 23 is rigidly and removably mounted in the arm 46.

The bores 33 and 33$^a$, for the reception of the pintles 31 of the frame members 25 and 25$^a$, are positioned in the plate 23, as shown in Figs. 3 and 7; the plate being slotted as at 51 and 52, to form spring arms 53 and 54, respectively. Clamp screws 55 and 56 extend loosely through bores 57 and 58 in the arms 53 and 54, and engage internally screw threaded bores 59 and 60 in the main body portion 61. Spring members 62 and 63 are mounted on clamp screws 55 and 56, intermediate their heads and the outer faces of the arms 53 and 54. Thus the slots 51 and 52 extending into the bores 33 and 33$^a$, forming spring arms 53 and 54, constitute clamps by means of which the pintles 31 are adjustably secured immovable in the plates 23 and 24 through the medium of screws 55 and 56.

Referring particularly to Fig. 3 it will be noted that the bores 33 and 33$^a$ are so positioned in the body portion 61 of the plate 23, relative to each other and to the brace member 38, as to offset both transversely and longitudinally of the vehicle body, or alined at an angle of approximately 45° with the side thereof. Being thus positioned the shield members 21 and 22 may be swung inwardly, in the tonneau, parallel with each other and with the back 17 of the front seat 11; or shield 21 may be either positioned parallel with the side of the vehicle body above the rear door, to enclose the tonneau across the front and sides thereof, or may be swung around forward, likewise parallel with the side of the vehicle body, to enclose the end of the front seat 11, as shown in dot-dash lines; the shield 22, when the shield 21 is in the latter position, being either left in the position shown in solid lines in Fig. 1, to enclose the front seat, or swung back to enclose the lateral side of the tonneau as shown in dot-dash lines in that figure. It will be further noted that the brace rod 38 is so positioned that it will not interfere with either of the shields 21 or 22 being moved to any of the aforementioned positions. Also it will be observed from an examination of the different positions of the shield members 21 and 22 in Fig. 1, that in any of the aforementioned positions the shield 21 is so mounted that its pivotal point (the frame member 25) will overlap the pivotal point of the shield 22, in a rearwardly direction, which overlapping will prevent cold air or rain from entering the vehicle when it is traveling in a forward direction.

It can now be readily seen that with the use of my improved mounting for the windshields they may be adjusted to the several positions above described to either enclose the front seat or to extend along the sides of the vehicle body to enclose both the front seat and the tonneau, and when used in connection with the adjustable side wings W, now very commonly in use, they will practically enclose the entire seating portion of the vehicle.

While I have here shown and described the preferred embodiment of my invention, it is nevertheless understood that I reserve the right to make any changes or modifications which may appear to those skilled in the art, and which will come within the scope of the appended claims.

Having described a preferred form of my invention, I claim:

1. An adjustable vehicle shield, embodying a supporting member adapted to be secured to the vehicle body near its side, and a pair of shield members pivoted on the member at separate pivotal points one of which is positioned rearwardly and outwardly from the other; whereby the shield member which is mounted on the forward and inward pivot may be swung inwardly across the vehicle or rearwardly along its side, and the other shield member may be swung inwardly across the vehicle, rearwardly along its side or forwardly along its side.

2. An adjustable vehicle shield, embodying a supporting bracket, a pair of shield members each pivotally mounted at its lower side and at a vertical edge on the bracket, the two members being so mounted at spaced pivotal points; a vertical brace rod rigidly mounted on the bracket near the vertical edges of the shield members, a plate rigidly carried by the upper end of the brace rod, and the two shield members being pivotally mounted at their upper sides and at their said vertical edges in said plate.

In witness that I claim the foregoing I have hereunto subscribed my name this 19th day of January, 1921.

ARTHUR C. LILLIE.

Witness:
VIRGINIA BERINGER.